(12) United States Patent
Kudo (10) Patent No.: US 7,035,532 B2
(45) Date of Patent: Apr. 25, 2006

(54) HEAT STORAGE APPARATUS WITH SPIRAL ELECTRICALLY HEATED PHASE CHANGE MATERIAL

(75) Inventor: Tomohide Kudo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/699,943

(22) Filed: Nov. 3, 2003

(65) Prior Publication Data
US 2004/0197090 A1    Oct. 7, 2004

(30) Foreign Application Priority Data
Nov. 22, 2002    (JP)    .............. 2002-339963

(51) Int. Cl.
*F28D 7/04*    (2006.01)
*H05B 1/00*    (2006.01)
*F24H 1/00*    (2006.01)

(52) U.S. Cl. .............. 392/341; 392/481; 165/10; 165/104.17

(58) Field of Classification Search .............. 392/341, 392/345–346, 339–340, 344, 486–490, 481–482, 392/494, 484, 485; 219/530, 540; 165/10, 165/104.17; 126/400
See application file for complete search history.

(56) References Cited

U.S. PATENT DOCUMENTS

| 2,097,581 | A | * | 11/1937 | Beyrodt | ............... 392/396 |
|---|---|---|---|---|---|
| 3,476,916 | A | * | 11/1969 | La Van | ............... 219/552 |
| 4,194,496 | A | * | 3/1980 | Carlson | ............... 126/620 |
| 4,343,989 | A | * | 8/1982 | Brosnan | ............... 392/346 |
| 4,445,566 | A | * | 5/1984 | Laing et al. | ............... 165/10 |
| 5,143,148 | A | | 9/1992 | Merryfull | |
| 5,954,119 | A | | 9/1999 | Yamamura et al. | |
| 2003/0017086 | A1 | * | 1/2003 | Bruck et al. | ............... 422/168 |

FOREIGN PATENT DOCUMENTS

| DE | 3101039 | * | 8/1982 | |
| IT | 543888 | * | 7/1957 | ............... 392/481 |
| JP | 62000795 | | 1/1987 | |
| JP | 4-187 | * | 1/1992 | |
| JP | 11264683 | | 9/1999 | |

* cited by examiner

*Primary Examiner*—John A. Jeffery
(74) *Attorney, Agent, or Firm*—Hamre, Schumann, Mueller & Larson, P.C.

(57) ABSTRACT

A heat storage apparatus comprises a heat storage material accommodation cell for accommodating therein a heat storage material having an electricity conductive characteristic and configured to be electrically heated, and a fluid passageway for allowing a heat exchanging fluid to flow therethrough, the fluid passageway being adjacent to the heat storage material accommodation cell via a bulkhead. The heat storage material accommodation cell and the fluid passageway are put in a spiral configuration together with the bulkhead in a heat storage main body of the heat storage apparatus. Heat held in the heat storage material is transferred to the heat exchanging fluid so as to be taken out of the heat storage apparatus.

5 Claims, 11 Drawing Sheets

HEAT STORAGE APPARATUS WITH SPIRAL ELECTRICALLY HEATED PHASE CHANGE MATERIAL

BACKGROUND OF THE INVENTION

1. Field of the Invention

The present invention relates to a heat storage apparatus of a type in which heat energy is taken out from a heat storage material which is electrically heated by a heat exchanging fluid.

2. Description of the Related Art

In recent years, a demand has been increasing that heat is stored using inexpensive power available late at night so that heat energy so stored is taken out for use in supplying hot water and heating rooms during the daytime, and in association with such a demand, there has been a tendency that high-performance heat storage apparatuses are demanded.

A heat-storage type heat exchanger is known as a heat storage apparatus in the related art (for example, in JP-A-11-264683 (paragraph [0012], FIG. 1)).

The related art will be described by reference to FIGS. 1A, 1B in the patent literature No. 1.

Figures 13, 14:
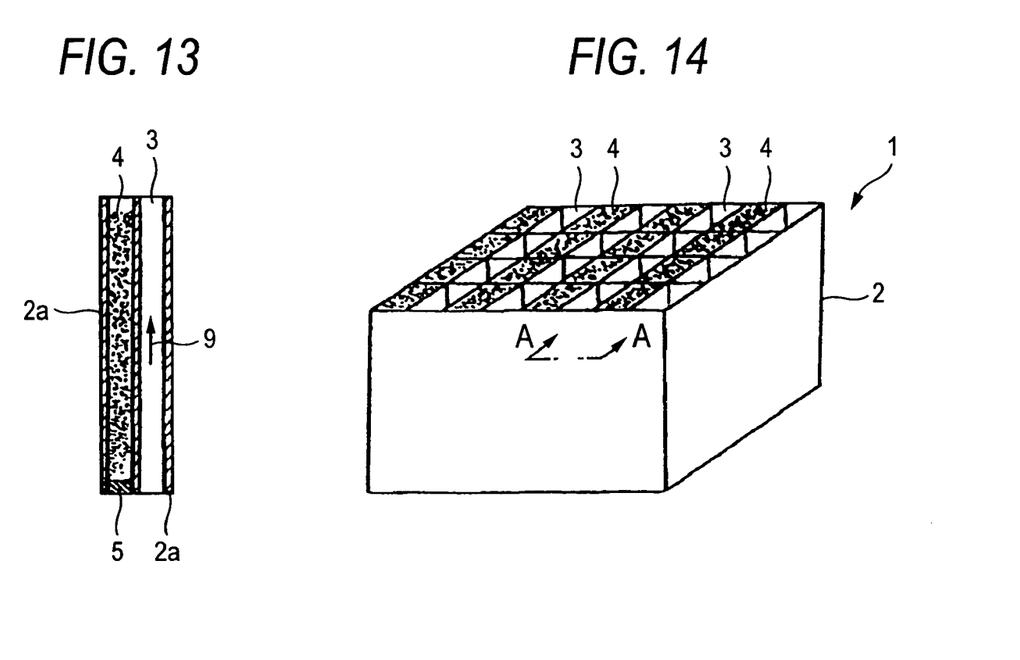
FIG. 13 is a diagram illustrating what is shown in FIG. 1B in JP-A-11-264683.
FIG. 14 is a diagram illustrating what is shown in FIG. 1A in JP-A-11-264683.

FIG. 13 is a drawing incorporated herein to illustrate what is illustrated in FIG. 1B of the patent literature No. 1, in the drawing, reference numeral 4 denotes a phase-changeable material, and reference numeral 3 denotes a fluid flow path. When a medium such as air is allowed to flow into the fluid flow path 3, this medium absorbs heat energy that the phase changeable material 4 possesses.

There is a statement in lines 6 to 7 in paragraph "0012" in the patent literature No. 1 that states, "a number of quadrangular flow paths 3 are formed by ceramic walls 2a."

FIG. 14 is a drawing incorporated herein to illustrate what is illustrated in FIG. 1A of the patent literature No. 1. It is seen from the drawing that a ceramic honeycomb 2 which constitutes a heat storage element 1 is partitioned in a grid-like fashion and that a multiplicity of quadrangular flow paths 3 and quadrangular phase changeable material accommodation cells for accommodating phase changeable material are provided.

The heat exchanger, in the related art, constituted by the quadrangular flow paths and phase changeable material accommodation cells has the following problems.

1) Since a number of fluid passageways each having a quadrangular shape exist alternately, it is difficult to allow a heat exchanging fluid to flow into all the fluid passageways uniformly, and there happen to be caused locations where the heat exchanging fluid flows in such a large amount that heat exchanging is completed so quickly and, on the contrary, locations where the heat exchanging fluid flows in such a small amount that heat exchanging is not promoted, thereby making it difficult to obtain a high performance as a whole.

2) Since a number of quadrangular heat storage material accommodation cells exist alternately, the volume of each heat storage material accommodation cell becomes small, and therefore, when heat is taken out of the phase changeable heat storage material, an excessively cooling phenomenon is easy to occur, and therefore, a stable output cannot be obtain.

Figure 15:
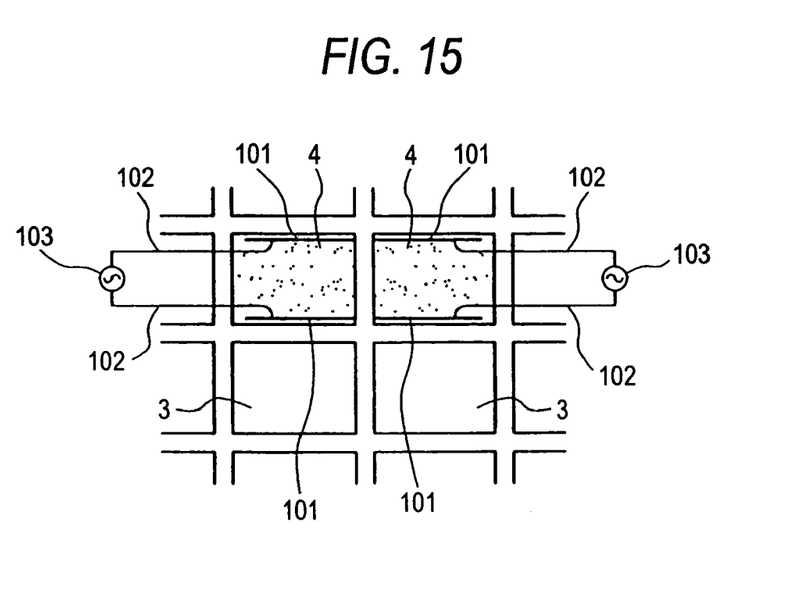
FIG. 15 is a diagram illustrating another problem inherent in the related art.

FIG. 15 is a drawing illustrating another problem inherent in the related art and corresponds to a partial view of FIG. 14, in which it is shown that phase changeable materials 4, 4 stored in quadrangular phase changeable material accommodation cells are placed adjacent to quadrangular flow paths 3, 3. In order to store heat using power available late at night so that the heat so stored is taken out as heat energy during the daytime, the following are needed: a material having an electricity conductive characteristic is used for the phase exchangeable material 4; electrode plates 101, 101 for phase changing the phase changeable material 4 are provided in each of the phase changeable material accommodation cell; and a power supply 103 is connected to these electrode plates 101, 101 via lead wires 102, 102.

Namely, the electrode plates 101, 101 are energized from the power supply 103 late at night so as to phase change the phase changeable material 4. During the daytime, energizing by the power supply 103 is halted, and a heat exchanging fluid such as air or water is allowed to flow through the flow path 3 so that heat is absorbed by the heat exchanging fluid to thereby take out heat energy.

However, the lead wire 102 needs to be drawn out from each electrode plate 101, and taking for example a case shown in FIG. 14, since the phase changeable material 4 is accommodated in 16 cells which are partitioned in a 4×4 fashion, 32 lead wires 102, which results from 16×2, need to be drawn out as a whole, and since such a large number of lead wires 102 need to be laid out, the production cost of the apparatus is increased and the feed control becomes difficult.

Namely, since a number of quadrangular heat storage material accommodation cells exist in an alternate fashion, in order to directly heat the heat storage material using Joule heat, electrode plates need to be placed in all the heat storage material accommodation cells and wiring needs to be installed for the electrode plates so placed. The layout of electric wires becomes complex very much, and this increases the number of components involved, as well as the production costs.

SUMMARY OF THE INVENTION

An object of the invention is to provide a heat storage apparatus which can enhance the heat exchanging performance and simplify the layout of electric wires.

With a view to attaining the object, according to a first aspect of the invention, there is provided a heat storage apparatus comprising: a heat storage material accommodation cell for accommodating therein a heat storage material having an electricity conductive characteristic and configured to be electrically heated; and a fluid passageway for allowing a heat exchanging fluid to flow therethrough, the fluid passageway being adjacent to the heat storage material accommodation cell via a bulkhead, wherein heat held in the heat storage material is transferred to the heat exchanging fluid so as to be taken out of the heat storage apparatus, and wherein the heat storage material accommodation cell and the fluid passageway are put in a spiral configuration together with the bulkhead in a heat storage main body of the heat storage apparatus.

Since the heat storage material accommodation cell and the fluid passageway are put in the spiral configuration, the numbers of heat storage material accommodation cells and fluid passageways can be decreased largely. By decreasing the numbers of cells and passageways like this, volumes of each heat storage material accommodation cell and fluid passageway can be increased largely, and in conjunction with these volume increases, the flow of the fluid can be easily uniformed, whereby the occurrence of an excessively cooling phenomenon of the heat storage material can be prevented, thereby making it possible to enhance the heat exchanging performance.

Since the number of the heat storage material accommodation cells can be decreased largely, the number of electrode plates which are attached to the cells also can be decreased largely, which leads to a simple layout of electric wires, whereby the production costs can be easily decreased.

According to a second aspect of the invention, the heat storage material has a property in which electric resistance increases drastically when the heat storage material changes its phase from a solid to a liquid.

Heat storing is completed by changing the phase from a solid to a liquid. In the event that the electric resistance is designed to increase drastically when the phase so changes, an autonomous control becomes possible in which a current value becomes small, and a temperature-electricity control device such as a thermostat can be omitted. In case such a control part can be saved, a further decrease in production costs can be attempted to be attained.

According to a third aspect of the invention, the heat storage main body is a cylindrical body in which the heat storage material accommodation cell and the fluid passageway are made to open in both end faces thereof, and both the end faces of the cylindrical body are closed with a top lid and a bottom lid, respectively.

In case the heat storage main body is the cylindrical body in which the heat storage material accommodation cell and the fluid passageway are made to open in both end faces thereof, the heat storage main body can be produced by an extrusion forming process, and the production cost of the heat storage main body can be decreased.

According to a fourth aspect of the invention, the heat storage main bodies are arranged in series via an intermediate plate.

Since the heat storage main bodies can be connected together in series by using the intermediate plate, the heat storage apparatus can be arranged freely according to specifications thereof.

According to a fifth aspect of the invention, an energizing lead pattern is provided on at least one of the lids, the lead pattern including a spiral pattern.

According to a sixth aspect of the invention, an energizing lead pattern is provided on at least one of the lids and the intermediate plate, the lead pattern including a spiral pattern.

In the event that the lead patterns are provided on at least one of the lids and intermediate plate, a highly reliable wiring can be installed at low costs. In addition, in the event that the spiral pattern is included in the lead patterns, since the spiral pattern is allowed to function as an inductance, power factor can be attempted to be improved.

BRIEF DESCRIPTION OF THE DRAWING

FIG. 5 is an explanatory diagram explaining how a heat exchanging fluid is allowed to flow and how the heat storage material is sealed in;

DETAILED DESCRIPTION OF THE INVENTION

An embodiment of the invention will be described below based on the accompanying drawings. Note that the drawings are to be seen in directions in which reference numerals are oriented.

Figure 1:
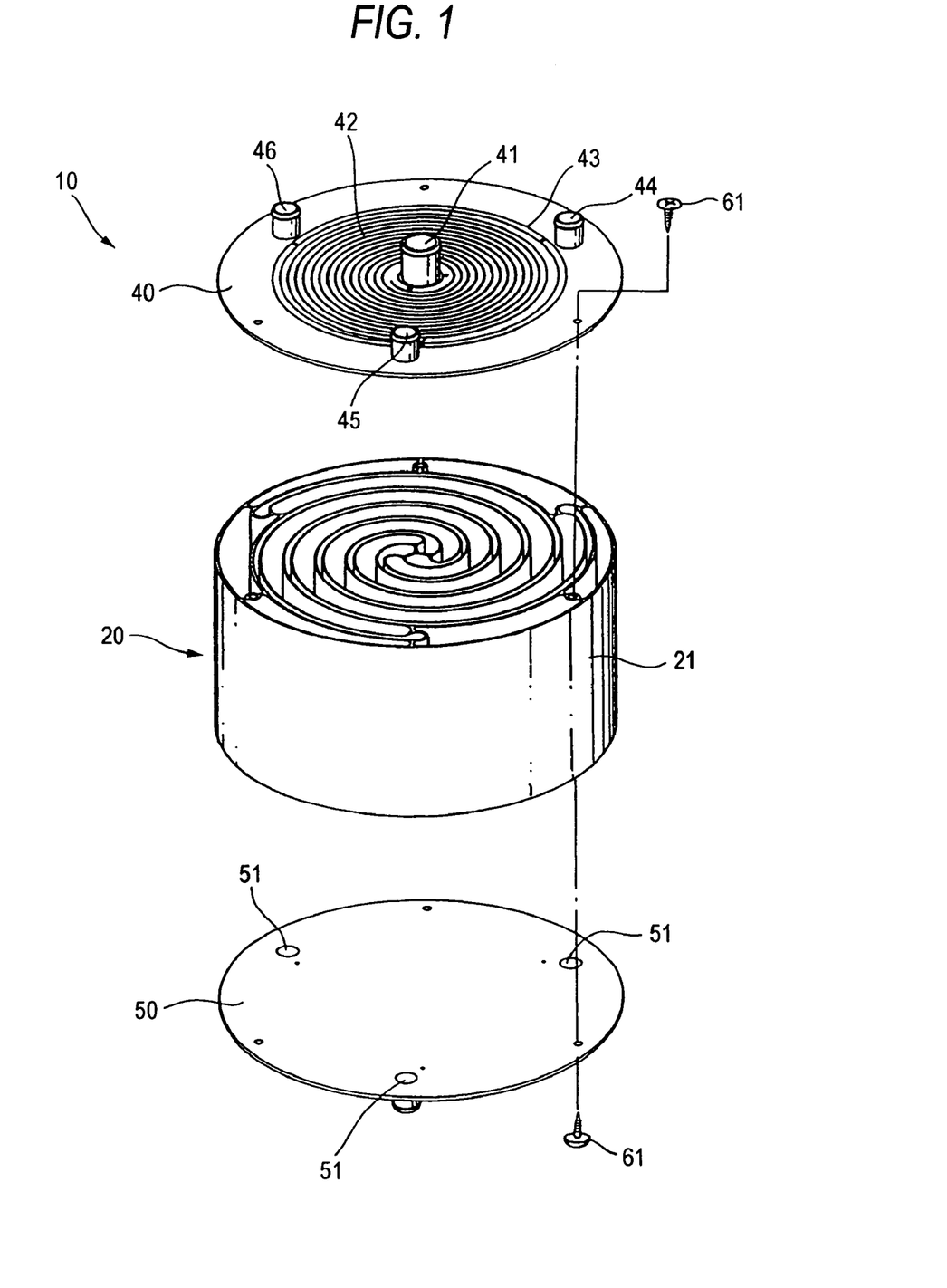
FIG. 1 is an exploded perspective view of a heat storage apparatus according to the invention.

FIG. 1 is an exploded perspective view of a heat storage apparatus according to the invention, and the heat storage apparatus 10 includes a cylindrical heat storage main body 20, a top lid 40 placed to cover a top side of the heat storage main body 20, a bottom lid 50 placed to close a bottom side of the heat storage main body 20 and retaining machine screws 61 . . . ( . . . denotes plurality).

A fluid inlet 41 for a heat exchanging fluid is provided in the center of the top lid 40, and a spiral lead pattern 42 is provided in such a manner as to surround the fluid inlet 41. Then, a ring-like lead pattern 43 is provided in such a manner as to surround the spiral lead pattern 42, and three heat storage material injecting ports 44, 45, 46 are provided in such a manner as to surround the ring-like lead pattern 43.

The lead patterns 42, 43 can be formed, respectively, on the top lid 40 and the bottom lid 50 which have an electricity insulation characteristic by way of a vacuum plating process or an electroless plating process.

Three fluid outlets 51 for the heat exchanging fluid are provided in the bottom lid 50.

A flexible resin such as EPDM (ethylene propylene diene rubber) is placed over a bottom side of the top lid 40 and a top side of the bottom lid 50 so as to secure a gastightness with the heat storage main body 20.

While the construction of the cylindrical heat storage main body 20 will be described next, for the sake of promotion of understanding, a description will first be made by reference to FIG. 2 (an extracted view) and FIG. 3 (an exploded view)

Figure 2:
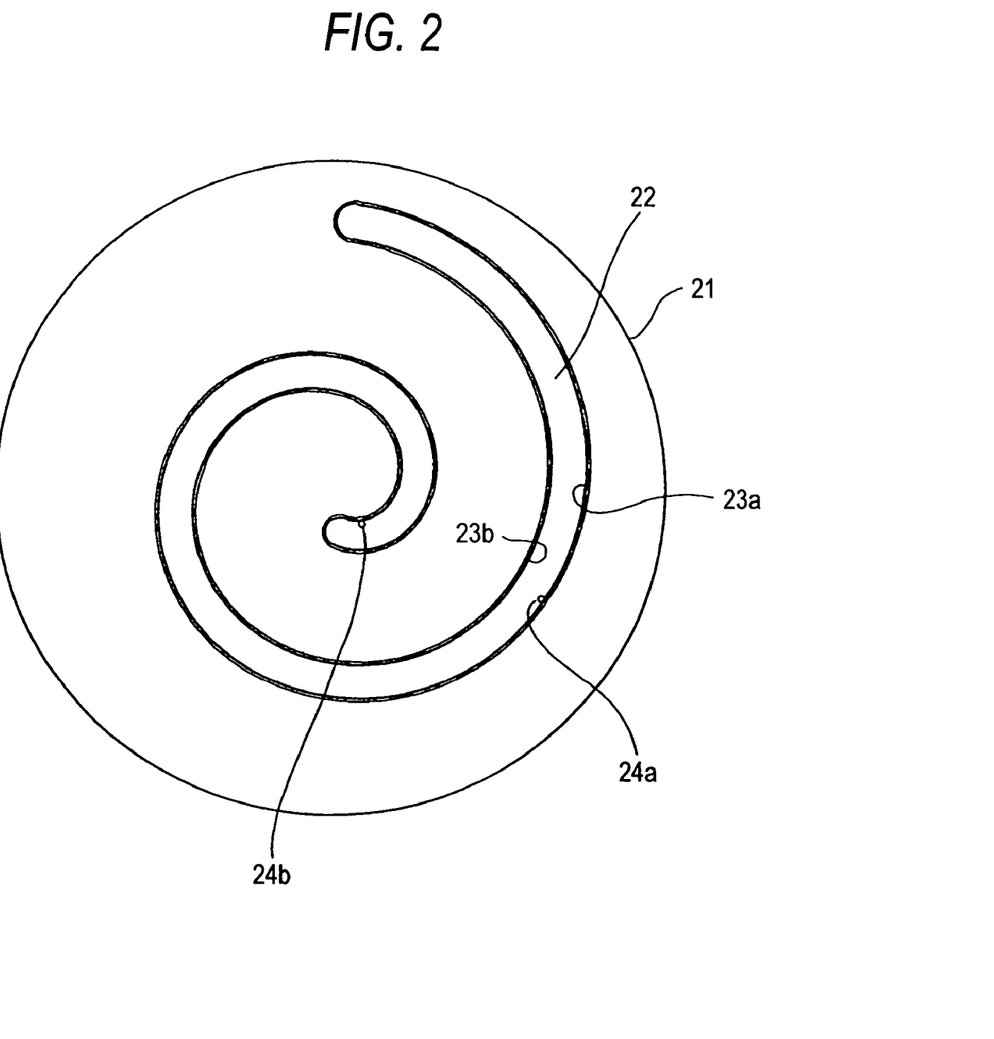
FIG. 2 is an extracted view of the heat storage apparatus according to the invention.

FIG. 2 is an extracted view of the heat storage main body 20 according to the invention and illustrates a construction in which a first heat storage material accommodation cell 22 which is spiral is provided in a cylindrical body, a first-a electrode plate 23a and a first-b electrode plate 23b are disposed in parallel in the first heat storage material accommodation cell 22, and a fist-a bolt 24a and a first-b bolt 24b are brought into contact with the first-a electrode plate 23a and the first-b electrode plate 23b, respectively.

Figure 3:
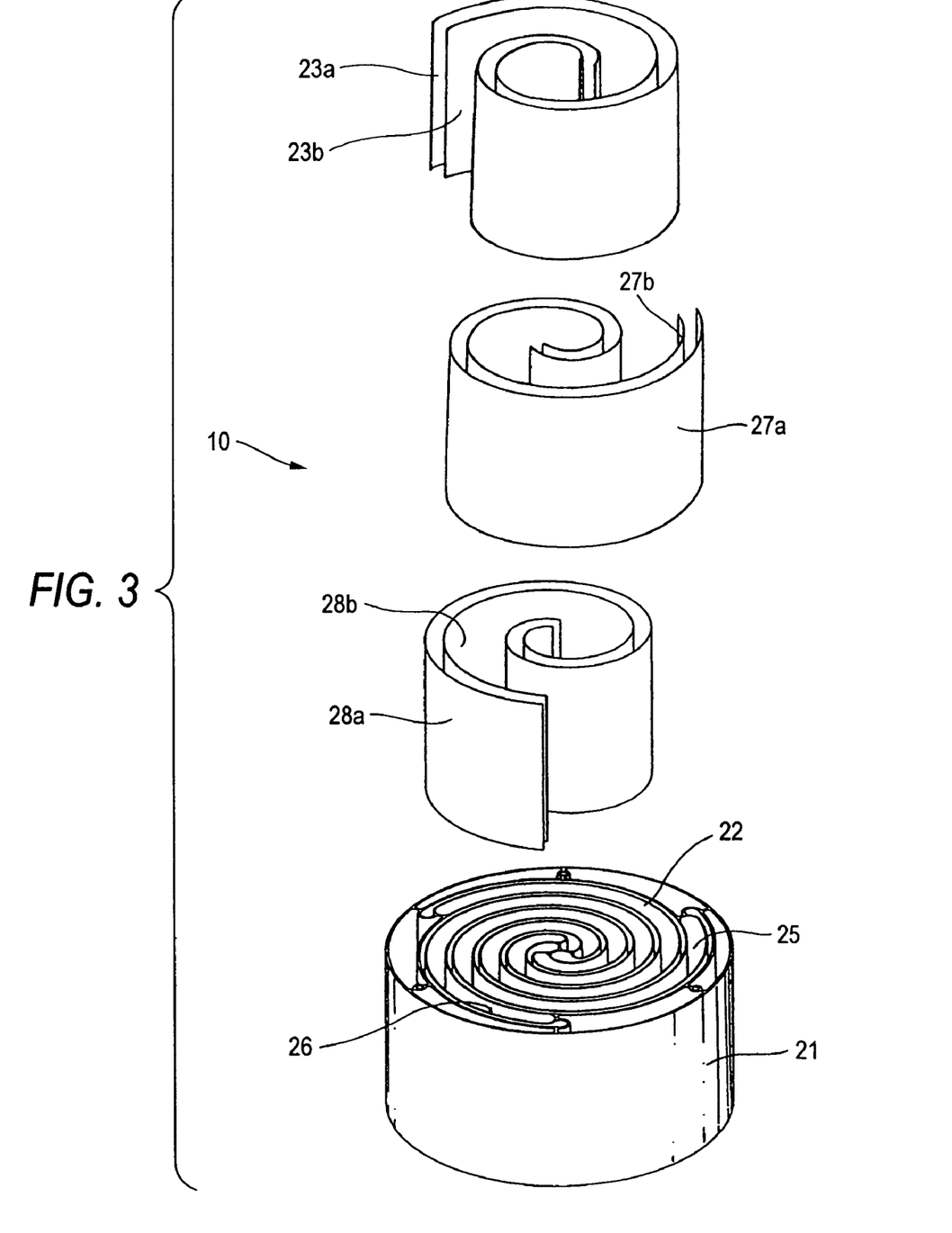
FIG. 3 is an exploded perspective view of a heat storage main body according to the invention.

FIG. 3 is an exploded view of the heat storage main body according to the invention and illustrates that the first spiral heat storage material accommodation cell 22, a second spiral heat storage material accommodation cell 25 and a third spiral heat storage material accommodation cell 26 are provided in the cylindrical body 21 with their phases being shifted through 120° from one another. Then, the heat storage main body 10 is constructed by inserting the first-a electrode plate 23*a* and the first-b electrode plate 23*b* into the first heat storage material accommodation cell 22 from thereabove, inserting a second-a electrode plate 27*a* and a second-b electrode plate 27*b* into the second heat storage material accommodation cell 25 from thereabove, and inserting a third-a electrode plate 28*a* and a third-b electrode plate 28*b* into the third heat storage material accommodation cell 26 from there above. Note that each electrode plate may be formed on a bulkhead, which will be described later on, by way of the vacuum plating process or the electroless plating process.

Figure 4:
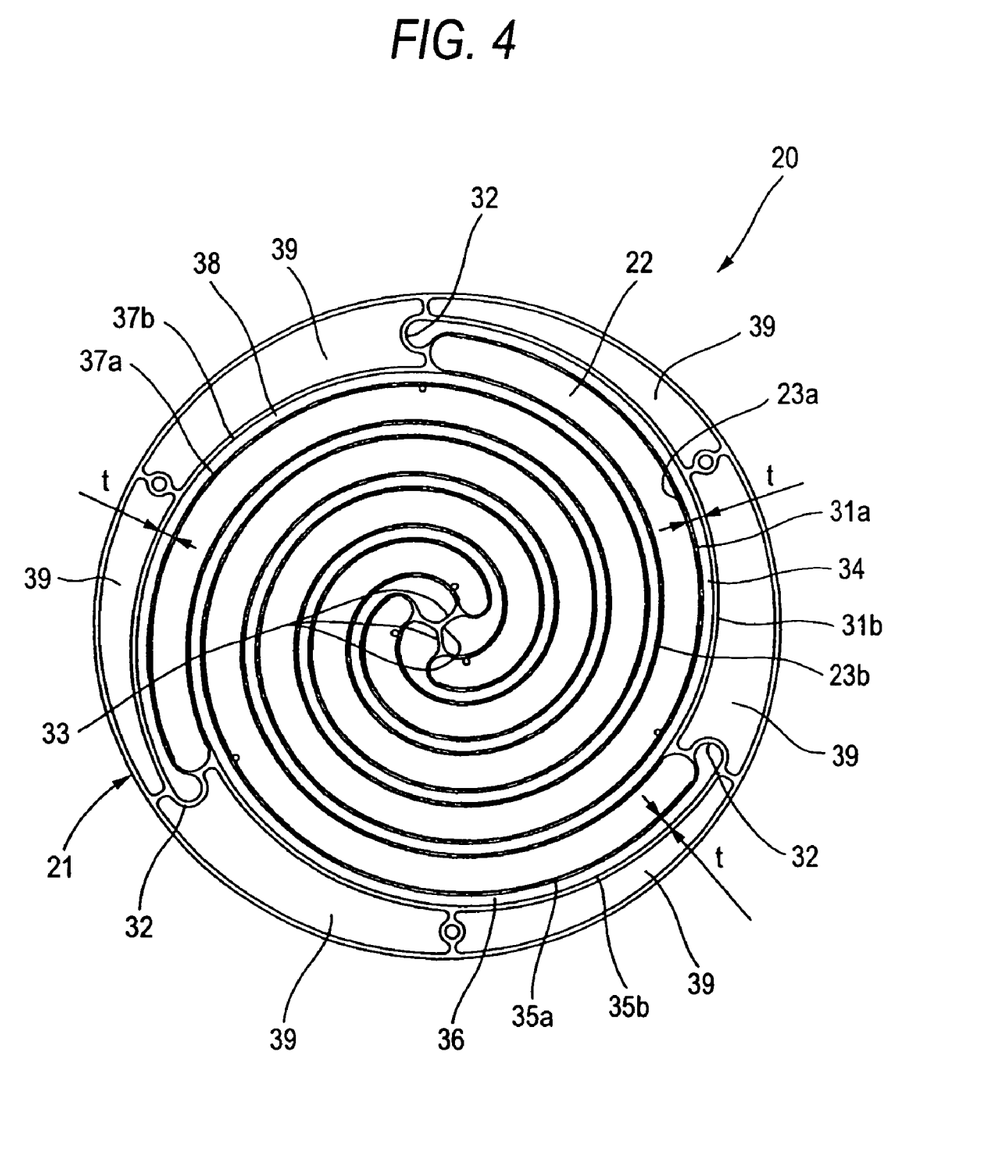
FIG. 4 is a plan view of the heat storage main body according to the invention.

FIG. 4 is a plan view of the heat storage main body according to the invention, and the cylindrical body 21 is partitioned by a group of extremely thin bulkheads. This group of bulkheads will be described in detail.

Firstly, a first spiral inner bulkhead 31*a* is provided in order for the first-a electrode plate 23*a* to follow there along. This first inner bulkhead 31*a* constitutes a spiral which turns one and a half rotations as with the first heat storage material accommodation cell 22 shown in FIG. 2.

Then, a first outer bulkhead 31*b* is provided outwardly of the first inner bulkhead 31*a* so provided with a gap "t" being provided therebetween.

An outer end portion of the first inner bulkhead 31*a* and an outer end portion of the first outer bulkhead 31*b* are connected to each other by way of a U-shaped wall 32. An inside diameter of this U-shaped wall 32 is set to about 2×t.

Similarly, an inner end portion of the first inner bulkhead 31*a* and an inner end portion of the first outer bulkhead 31*b* are connected to each other by way of a U-shaped wall 33. An inside diameter of this U-shaped wall 33 is set to about 3×t.

Heat exchanging fluid tends to stay longer or stop in corner portions when compared with other locations of the flow passageway. Then, by setting the inside diameters of the U-shaped walls 32, 33 to the (2 to 3)×t, heat exchanging fluid is prevented from staying longer or stopping thereat, whereby the heat exchanging fluid is devised to flow uniformly.

Thus, the first inner bulkhead 31*a* and the first outer bulkhead 31*b* together constitutes a first fluid flow passageway 34 having the gap "t".

In similar manners, a second fluid passageway 36 is constituted by a second inner bulkhead 35*a* and a second outer bulkhead 35*b*, and a third fluid passageway 38 is constituted by a third inner bulkhead 37*a* and a third outer bulkhead 37*b*.

Reference numerals 39 . . . denote heat insulation cells which are provided as required, and the heat insulation cell may be constituted by a space or may be filled with a heat insulation material.

The cylindrical body 21 is produced from materials having a good electrical insulation characteristic by way of extrusion forming, injection molding, shaping, sintering or other processes. Resins such as PE (polyethylene), PP (polypropylene), PPS (polyphenylene sulfide), and PET (polyethylene terephthalate) and ceramics are suitable as the materials having a good electrical insulation characteristic.

Figure 5:
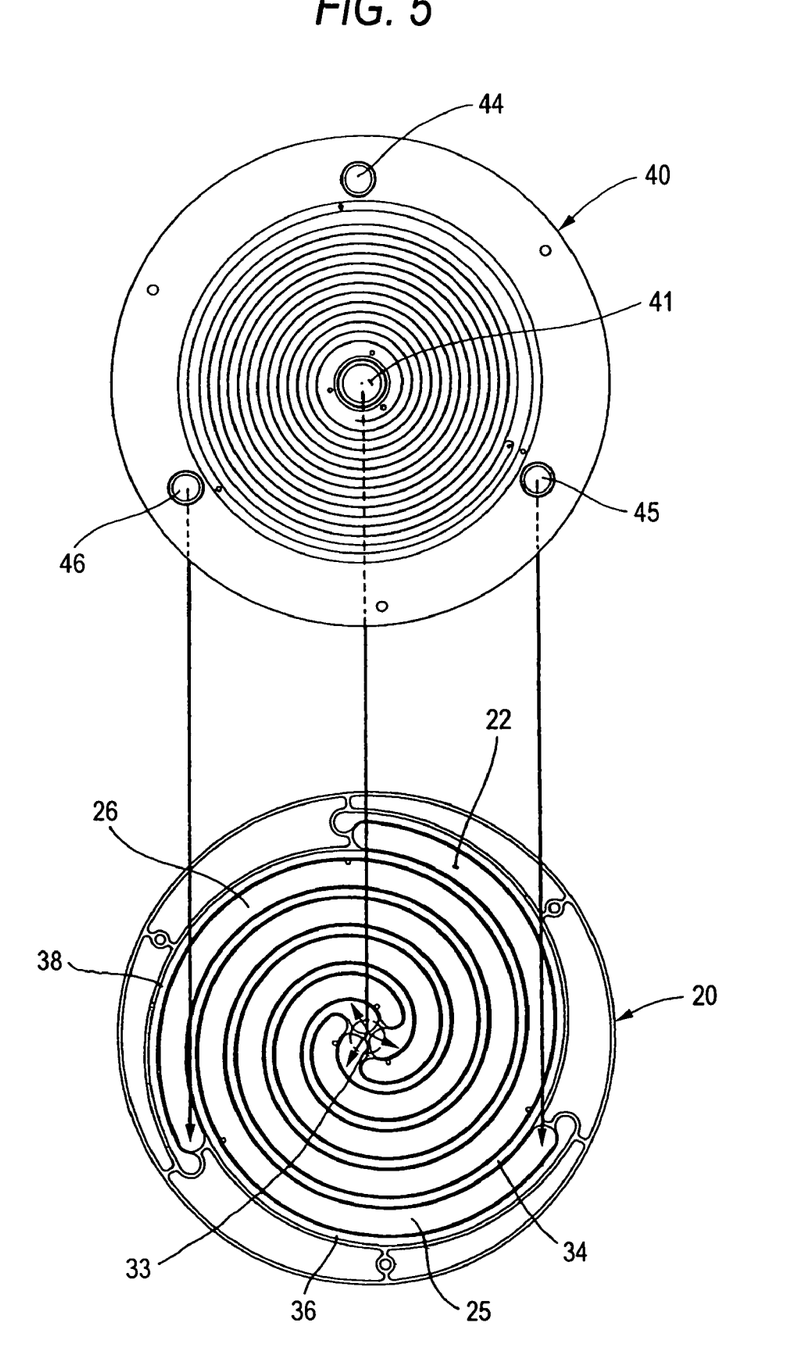

FIG. 5 is an explanatory diagram illustrating how the heat exchanging fluid is allowed to flow and how the heat storage material is sealed. Note that for the sake of conveniences in explanation, the heat storage main body 20 and the top lid 40 are illustrated as being separated from each other.

When the heat exchanging fluid is supplied from the fluid inlet 41 in the center of the top lid 40, the heat exchanging fluid so supplied comes into abutment with the U-shaped walls 33 . . . which form together a Y shape is then divided into three streams as indicated by arrows so as to flow into the first to third fluid passageways 34, 36, 38. Having passed through the first to third fluid passageways 34, 36, 38, the heat exchanging fluid flows out from the fluid outlets 51 (refer to FIG. 1) in the bottom lid 50.

On the other hand, a heat storage material 71 (refer to FIG. 8) is injected from the heat storage material injection port 45 into the second heat storage material accommodation cell 25. The heat storage material is injected from the heat storage material injection port 44 into the first heat storage material accommodation cell 22 and is also injected from the heat storage material injection port 46 into the third heat storage material accommodation cell 26.

The heat injection storage material 71 to be injected is a material which can phase change from a solid to a liquid and conduct electricity and which includes charge carriers which are free electrons, ions or holes. To be specific, suitable examples are a material in which graphite is mixed and dispersed in paraffin and a material in which a conductor is mixed and dispersed in a heat storage material of a sugar alcohol system such as erythritol.

It is preferable to use a heat storage material having a PTC (Positive Temperature Coefficient) property in which electric resistance increases largely when a phase change from a solid to a liquid occurs.

A heat storage is completed when a phase change from a solid to a liquid occurs. In case electric resistance is designed to increase drastically when such a phase change occurs to complete a heat storage, an autonomous control in which the current value becomes small becomes possible, whereby a temperature-electricity control device such as a thermostat can be saved. In case such a control device can be saved, a further reduction in the production costs can be attempted.

Figure 6:
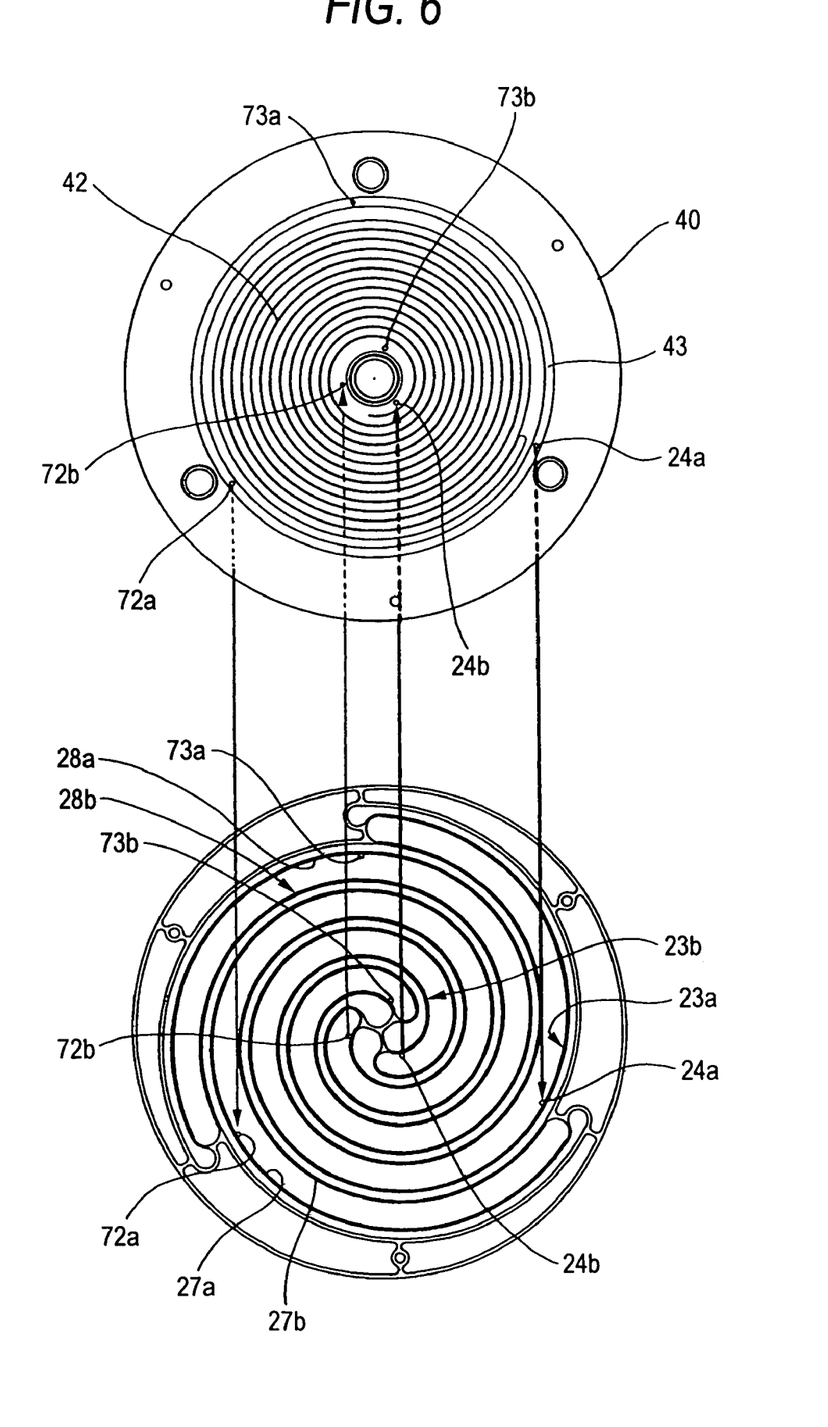
FIG. 6 is an explanatory diagram illustrating a construction for energizing an electrode plate from an external location.

FIG. 6 is an explanatory diagram illustrating a construction for energizing the electrode plates from the outside, the first-a bolt 24*a* is suspended from the ring-like lead pattern 43 on the top lid 40 so as to be brought into contact with the first-a electrode plate 23*a*. In addition, the first-b bolt 24*b* is suspended from the spiral lead pattern 42 on the top lid 40 so as to be brought into contact with the first-b electrode plate 23*b*.

Similarly, a second-a bolt 72*a* suspended from the ring-like lead pattern 43 is brought into contact with the second-a electrode plate 27*a*, and a second-b bolt 72*b* suspended from the spiral lead pattern 42 is brought into contact with the second-b electrode plate 27*b*.

Furthermore, a third-a bolt 73*a* suspended from the ring-like lead pattern 43 is brought into contact with the third-a electrode plate 28*a*, and a third-b bolt 73*b* suspended from the spiral lead pattern 42 is brought into contact with the third-b electrode plate 28*b*.

Figure 7:
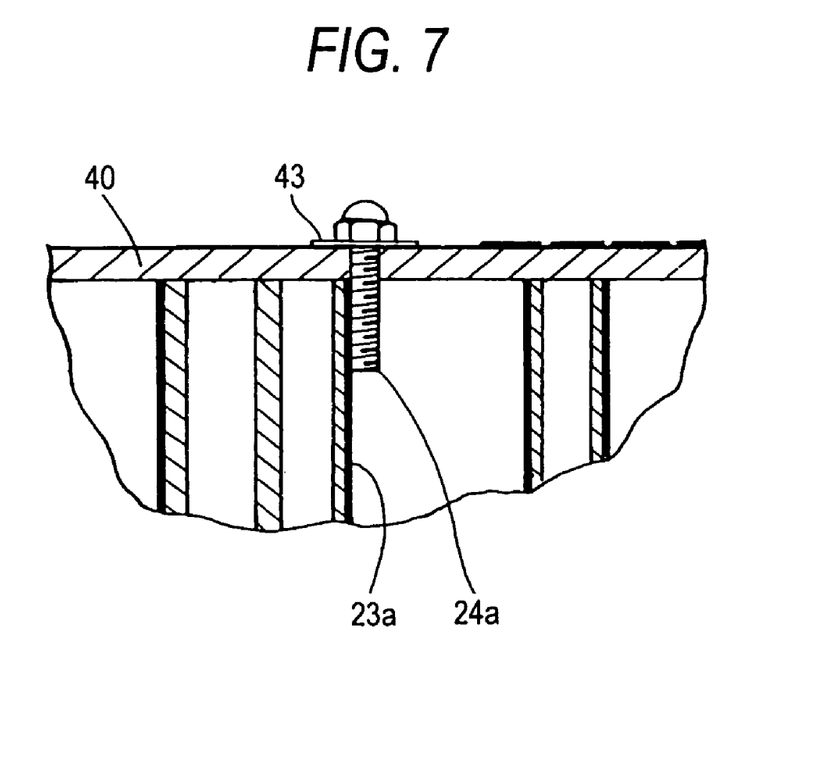
FIG. 7 is a diagram illustrating a relationship between lead patterns, bolts and electrode plates which are adopted in the invention.

FIG. 7 is a diagram illustrating a relationship between the lead pattern adopted in the invention, the bolt and the electrode plate, in which, for example, the first-a bolt 24*a* is illustrated as being suspended from the ring-like lead pattern 43, so that the bolt 24*a* is brought into contact with the first-a electrode plate 23*a*. Since the same relationship results with respect to the other bolts, the description thereof will be omitted herein.

Figure 8:
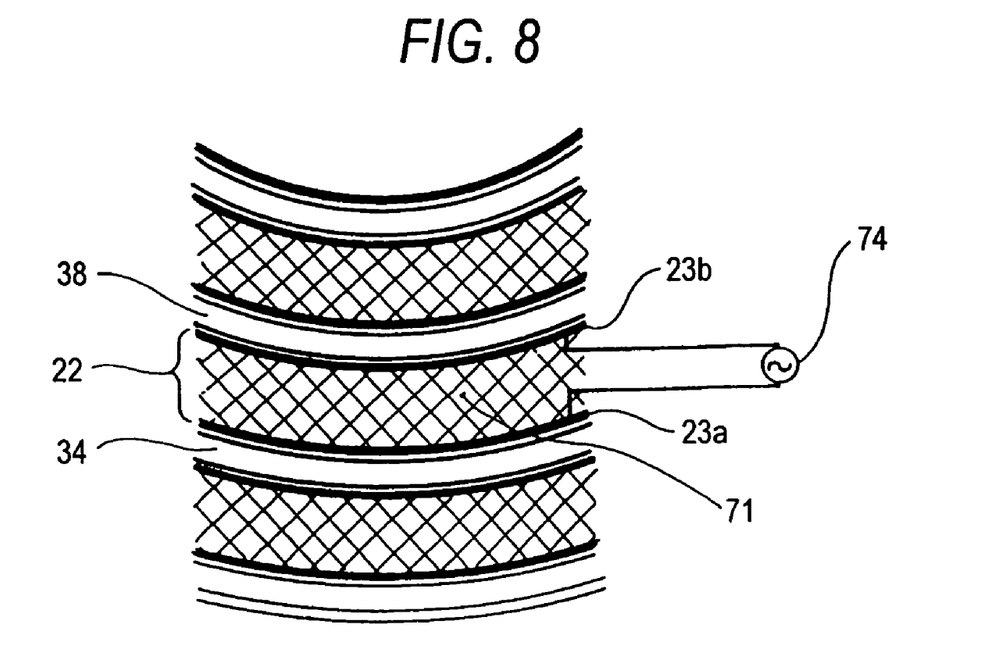
FIG. 8 is an explanatory diagram illustrating the function of the heat storage apparatus according to the invention.

FIG. 8 is a diagram describing the function of the heat storage apparatus according to the invention. In order to facilitate the description, only the first heat storage material accommodation cell 22 will be described.

Firstly, late at night, a single-phase alternating current power supply 74 is connected to the first-a electrode plate 23a and the first-b electrode plate 23b of the first heat storage material accommodation cell 22. Then, electric current conducts to the heat storage material 71 via the pair of electrode plates 23a, 23b, and the temperature of the heat storage material 71 increases due to Joule heat. In the invention, since the sufficiently large electrode plates 23a, 23b are disposed at a small interval, it is possible to generate Joule heat uniformly in the heat storage material 71.

Then, the phase of the heat storage material 71 is changed from a solid to a liquid at a point where the temperature of the heat storage material 71 has reached its fusing point, whereby a large magnitude of energy can be stored as latent heat.

Thereafter, feeding is stopped and the energy so stored will be ready for use during the daytime.

During the daytime, a heat exchanging fluid (air or water) is allowed to flow into the first fluid passageway 34 as required. Then, the heat exchanging fluid takes heat away from the heat storage material 71 via the bulkhead and the temperature of the heat exchanging material 71 itself is increased. Thus, the energy is taken out from the heat exchanging fluid to the outside for use as a heat energy for supplying hot water or heating rooms.

Thus, while the first heat storage material accommodation cell 22 and the first fluid passageway 34 have been described above, a similar description will be made with respect to the second and third heat storage cells 25, 26 and the second and third fluid passageways 36, 38.

Figure 9:
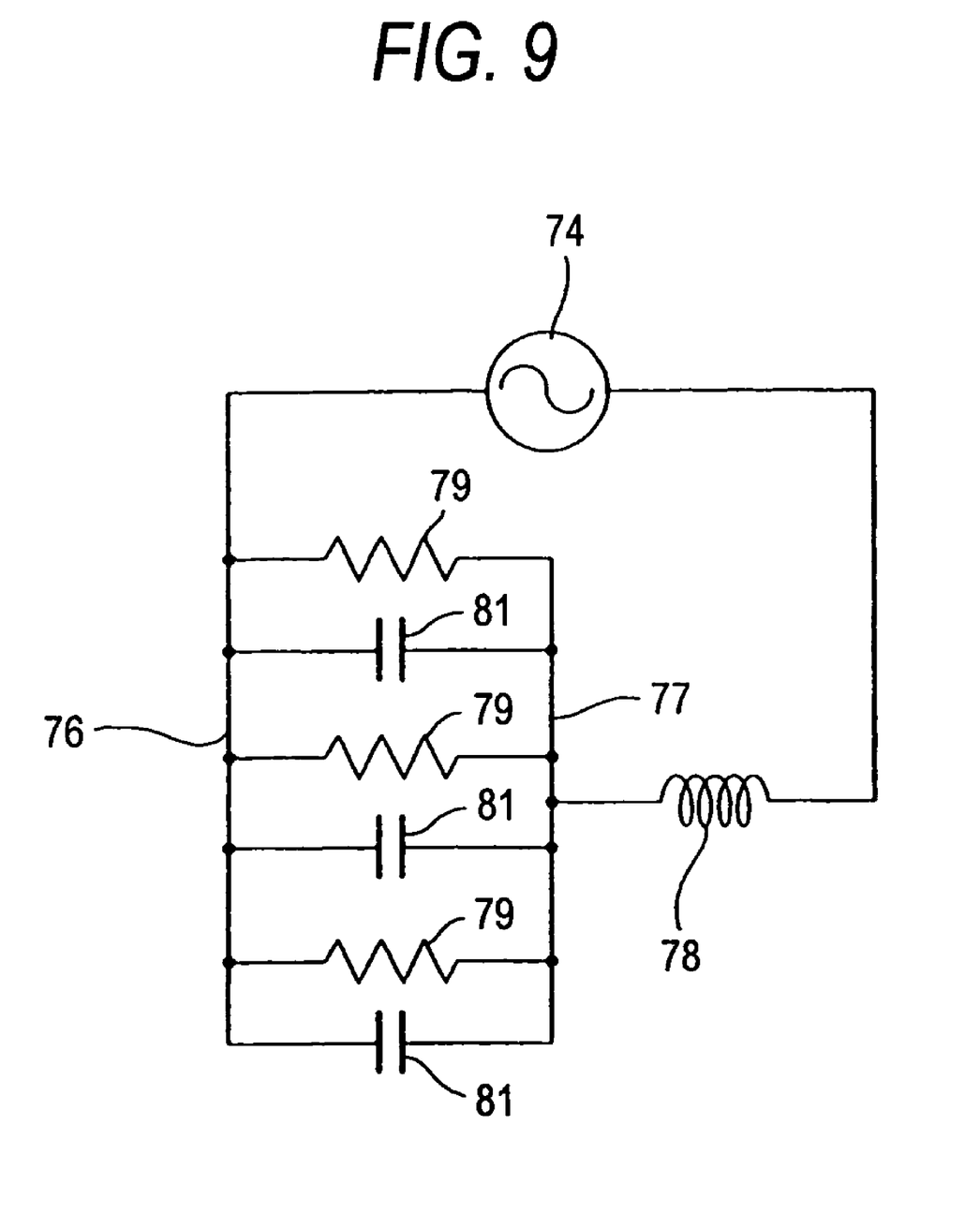
FIG. 9 is an electric circuit diagram with a single-phase alternating current being used as a power supply.

FIG. 9 is an electric circuit diagram with a single-phase alternating current being used as a power supply, and since an "a" line 76 corresponds to the ring-like lead pattern 43 (refer to FIG. 1), a "b" line 77 and an inductance 78 correspond to the spiral lead pattern 42 (refer to FIG. 1), resistors 79 . . . correspond to the heat storage material 71 (refer to FIG. 8), and dielectrics 81 . . . correspond to the electrode plates 23a, 23b, 27a, 27b, 28a, 28b, a circuit shown in the drawing can be drawn.

The spiral pattern is included in the lead pattern, and since this spiral pattern can be made to function as an inductance, the improvement in power factor can be attempted.

While the single-phase alternating current is used in the example that has been described heretofore, the single-phase alternating current can be replaced by a three-phase alternating current.

Figure 10:
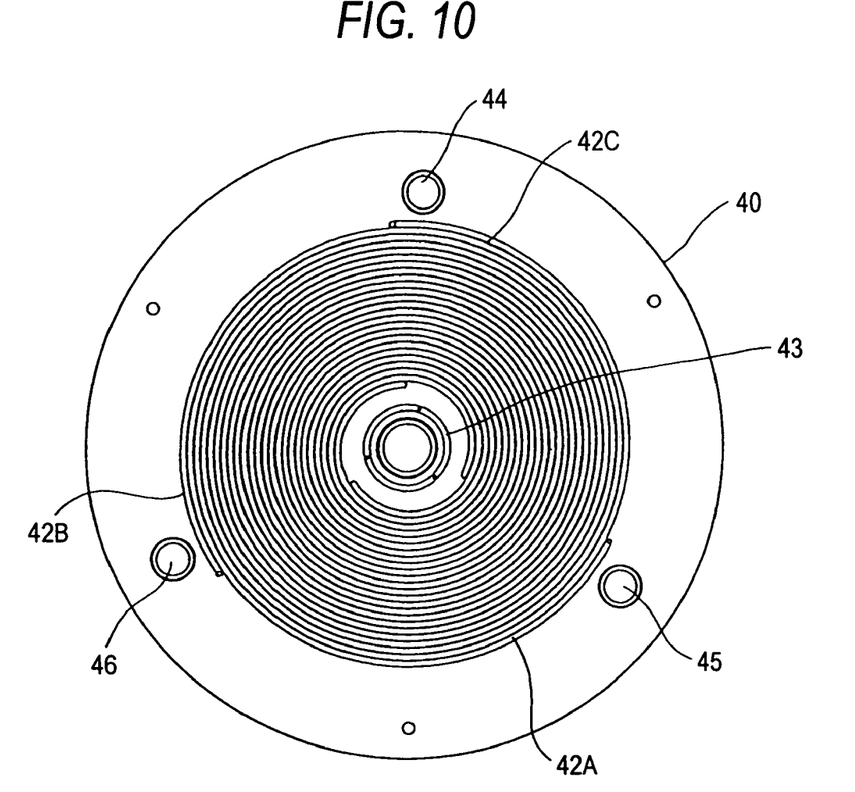
FIG. 10 is a lead pattern preferred for a three-phase alternating current.

FIG. 10 is a lead pattern diagram which is preferred for a case where a three-phase alternating current is used as a power supply, and a small ring-like lead pattern 43 is disposed on the top lid 40, and large ring-like lead patterns 42A, 42B, 42c are disposed in such a manner as to surround the small ring-like lead pattern 43.

Figure 11:
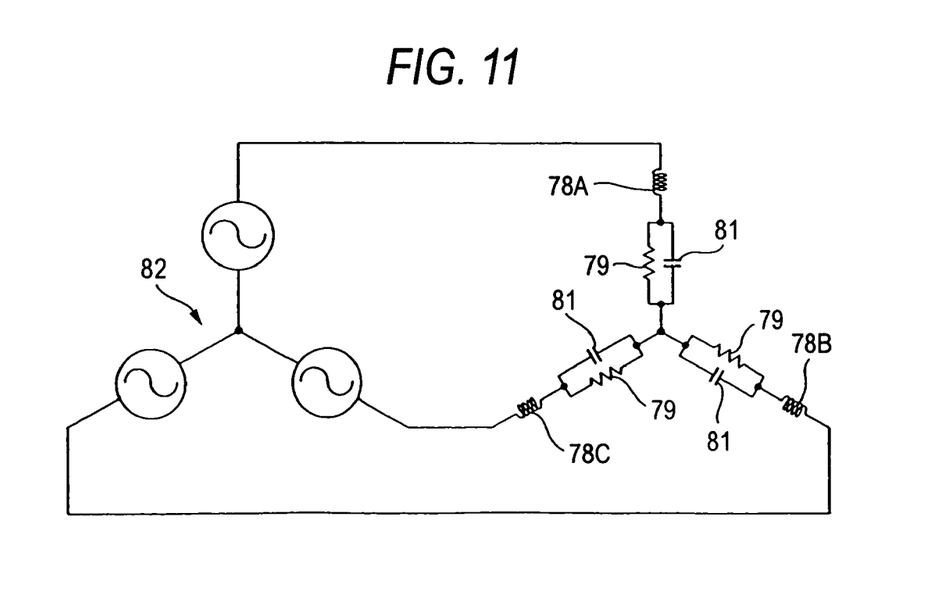
FIG. 11 is an electric circuit diagram with a three-phase alternating current being used as a power supply.

FIG. 11 is an electric circuit diagram with a three-phase alternating current being used as a power supply, and the spiral lead pattern 42A described in FIG. 10 is replaced by an inductance 78A in FIG. 11. Similarly, the spiral lead patterns 42B, 42C described in FIG. 10 are replaced by inductances 78B, 78C in FIG. 11, and the power supply is replaced by a three-phase alternating current power supply 82. From this, an electric circuit diagram as shown in FIG. 11 can be drawn.

In a case where there are three heat storage accommodation cells as with the embodiment, this is suitable for feeding with the three-phase alternating current power supply 82.

Figure 12:
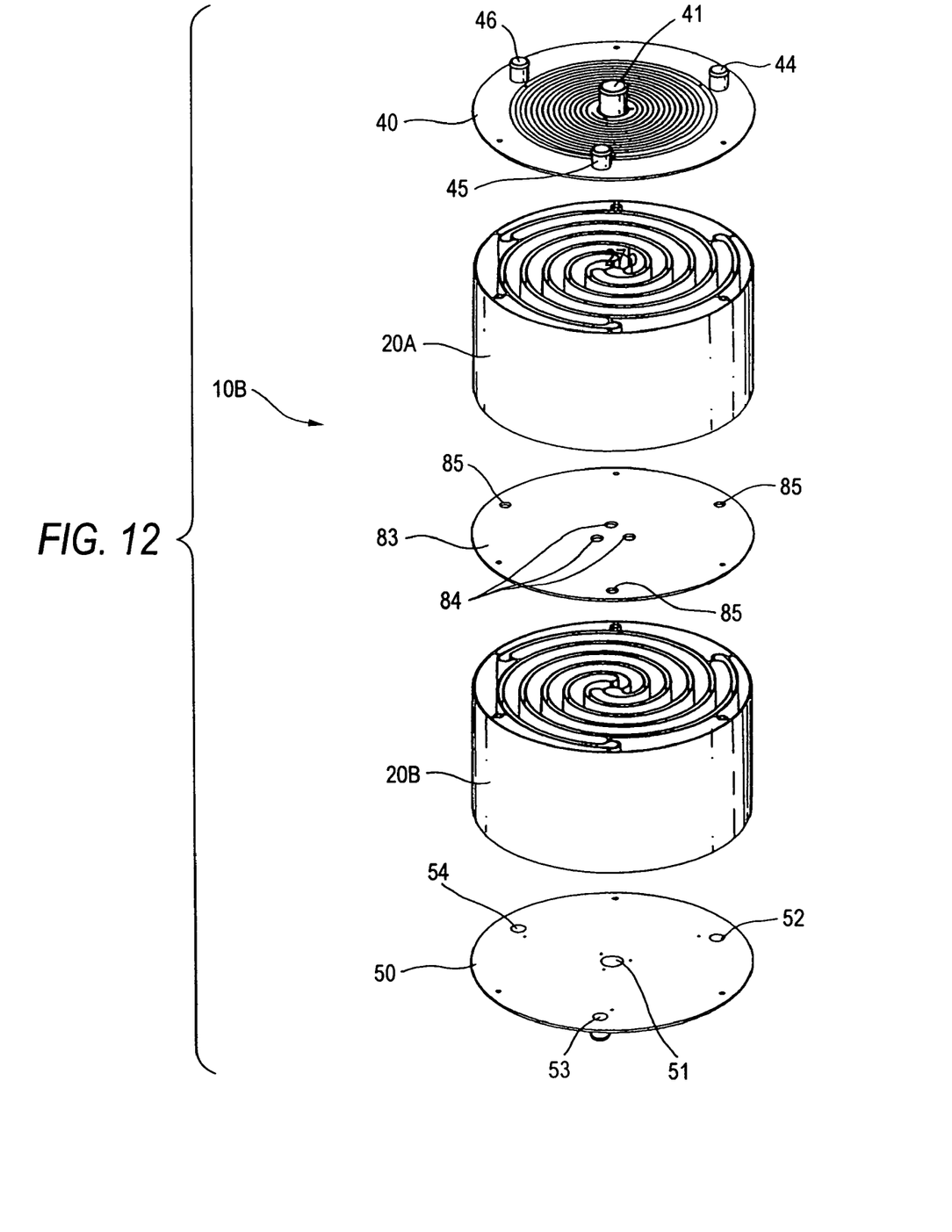
FIG. 12 is an exploded perspective view of a multi-stage heat storage apparatus according to the invention.

FIG. 12 is an exploded perspective view of a multi-stage heat storage apparatus according to the invention, in which a heat storage apparatus 10B can be constructed into multiple stages comprising two or more stages by a top lid 40, an upper heat storage main body 20A, an intermediate plate 83, a lower heat storage main body 20B and a bottom lid 50. While the heat storage main bodies 20A, 20B are identical with the heat storage main body 20, the suffixes A, B are imparted to clarify their positions.

Heat storage material passing holes 84, 84, 84 and fluid passing openings 85, 85, 85 are provided in the intermediate plate 83. Furthermore, a lead pattern is provided, as required, on the intermediate plate 83 having an electrical insulating property.

A flexible resin such as EPDM (ethylene propylene diene rubber) is placed over top and bottom sides of the intermediate plate 83 so as to secure gastightness between the heat storage main bodies 20A, 20B.

Note that while, in this embodiment, there are provided three heat storage material accommodation cells, with the single-phase alternating current being used as a power supply, there may be provided one, two or four heat storage material accommodation cells. With the three-phase alternating current being used as a power supply, there maybe provided heat storage material accommodation cells in multiples of three such as three, six or nine cells. Consequently, the heat storage material accommodation cell that is formed in the heat storage main body may be formed into at least a spiral configuration, and the number of cells is arbitrary.

In addition, the retaining machine screw may be replaced by a bolt which are longer than the length of the cylindrical body and a pair of nuts which are screwed onto both end portions of the bolt.

Alternately, neither retaining screw nor bolt may be used, and instead, there may be caused no problem even if the top lid, the bottom lid and the intermediate plate are integrally bonded together with the heat storage main body. For such an integral bonding, ultrasonic fusing, laser-beam fusing, brazing, bonding with an adhesive or any other processes can be used.

The invention constructed as has been described heretofore can exhibit the following advantages.

According to the first aspect of the invention, since the heat storage material accommodation cell and the fluid passageway are put in the spiral configuration, the numbers of heat storage material accommodation cells and fluid passageways can be decreased largely. By decreasing the numbers of cells and passageways like this, the volumes of each heat storage material accommodation cell and fluid passageway can be increased largely, and in conjunction with these volume increases, the flow of the fluid can be easily uniformed, whereby the occurrence of an excessively cooling phenomenon of the heat storage material can be prevented, thereby making it possible to enhance the heat exchanging performance.

Since the number of the heat storage material accommodation cells can be decreased largely, the number of electrode plates which are attached to the cells also can be decreased largely, which leads to a simple layout of electric wires, whereby the production costs can be easily decreased.

According to the second aspect of the invention, the heat storage material has the property in which electric resistance increases drastically when the heat storage material changes its phase from a solid to a liquid.

Heat storing is completed by changing the phase from a solid to a liquid. In the event that the electric resistance is designed to increase drastically when the phase so changes, an autonomous control becomes possible in which the current value becomes small, and the temperature-electricity control device such as a thermostat can be omitted. In case such a control part can be saved, a further decrease in production costs can be attempted to be attained.

According to the third aspect of the invention, the heat storage main body is the cylindrical body in which the heat storage material accommodation cell and the fluid passageway are made to open in both end faces thereof, and both the end faces of the cylindrical body are closed with the top lid and the bottom lid, respectively.

In case the heat storage main body is the cylindrical body in which the heat storage material accommodation cell and the fluid passageway are made to open in both the end faces thereof, the heat storage main body can be produced by an extrusion forming process, and the production cost of the heat storage main body can be decreased.

According to the fourth aspect of the invention, the heat storage main bodies are arranged in series via the intermediate plate.

Since the heat storage main bodies can be connected together in series by using the intermediate plate, the heat storage apparatus can be arranged freely according to specifications thereof.

According to the fifth aspect of the invention, the energizing lead patterns are provided on at least one of the lids, the lead pattern including a spiral pattern.

According to the sixth aspect of the invention, the energizing lead patterns are provided on at least one of the lids and the intermediate plate, the lead pattern including a spiral pattern.

In the event that the lead patterns are provided on at least one of the lids and intermediate plate, a highly reliable wiring can be installed at low costs. In addition, in the event that the spiral pattern is included in the lead patterns, since the spiral pattern is allowed to function as an inductance, power factor can be attempted to be improved.

What is claimed is:

1. A heat storage apparatus comprising:

a heat storage material accommodation cell for accommodating therein a heat storage material having en electricity conductive characteristic and configured to be electrically heated; and a fluid passageway for allowing a heat exchanging fluid to flow therethrough, the fluid passageway being adjacent to the heat storage material accommodation cell via a bulkhead, wherein heat held in the heat storage material is transferred to the heat exchanging fluid so as to be taken out of the heat storage apparatus, and wherein the heat storage material accommodation cell and the fluid passageway are put in a spiral configuration together with the bulkhead in a heat storage main body of the heat storage apparatus, the heat exchanging fluid flowing in a spiral manner along the fluid passageway having the spiral configuration, wherein the heat storage material has a property in which electric resistance increases drastically when the heat storage material changes its phase from a solid to a liquid.

2. A heat storage apparatus comprising:

a heat storage material accommodation cell for accommodating therein a heat storage material having an electricity conductive characteristic and configured to be electrically heated; and a fluid passageway for allowing a heat exchanging fluid to flow therethrough, the fluid passageway being adjacent to the heat storage material accommodation cell via a bulkhead, wherein heat held in the heat storage material is transferred to the heat exchanging fluid so as to be taken out of the heat storage apparatus, wherein the heat storage material accommodation cell and the fluid passageway are put in a spiral configuration together with the bulkhead in a heat storage main body of the heat storage apparatus, the heat exchanging fluid flowing in a spiral manner along the fluid passageway having the spiral configuration, and wherein the heat storage main body is a cylindrical body in which the heat storage material accommodation cell and the fluid passageway are made to open in both end faces thereof, and wherein both the end faces of the cylindrical body are closed with a top lid and a bottom lid, respectively.

3. A heat storage apparatus as set forth in claim 2, wherein the heat storage main bodies are arranged in series via an intermediate plate.

4. A heat storage apparatus as set forth in claim 3, wherein an energizing lead pattern is provided on at least one of the lids and the intermediate plate, the lead pattern including a spiral pattern.

5. A heat storage apparatus as set forth in claim 2, wherein an energizing lead pattern is provided on at least one of the lids, the lead pattern including a spiral pattern.

* * * * *